United States Patent
Zaslavsky et al.

(10) Patent No.: US 11,625,626 B2
(45) Date of Patent: Apr. 11, 2023

(54) PERFORMANCE IMPROVEMENT RECOMMENDATIONS FOR MACHINE LEARNING MODELS

(71) Applicant: RSA Security LLC, Bedford, MA (US)

(72) Inventors: Alex Zaslavsky, Brookline, MA (US); Arkady Koganov, Chestnut Hill, MA (US); Anatoly Gendelev, Rahovot (IL)

(73) Assignee: RSA Security LLC, Bedford, MA (US)

( * ) Notice: Subject to any disclaimer, the term of this patent is extended or adjusted under 35 U.S.C. 154(b) by 585 days.

(21) Appl. No.: 16/778,084

(22) Filed: Jan. 31, 2020

(65) Prior Publication Data
US 2021/0241130 A1    Aug. 5, 2021

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | | |
|---|---|---|---|---|
| 10,423,403 B1 * | 9/2019 | Natarajan | ............ | G06V 30/153 |
| 11,018,967 B2 * | 5/2021 | Cohen | ................ | H04L 43/0864 |
| 11,048,773 B1 * | 6/2021 | Gokhan | .................. | G06F 17/15 |
| 11,276,023 B1 * | 3/2022 | Butler | ................ | G06Q 20/4016 |
| 2019/0228527 A1 * | 7/2019 | Ramirez | ................ | G16B 40/10 |
| 2019/0306044 A1 * | 10/2019 | Cohen | .................... | H04L 67/535 |
| 2020/0372338 A1 * | 11/2020 | Woods, Jr. | ...... | G06Q 10/063112 |
| 2021/0117977 A1 * | 4/2021 | Kim | ........................ | G06F 17/15 |
| 2022/0129804 A1 * | 4/2022 | Dooley | ............. | G06Q 10/0635 |

OTHER PUBLICATIONS

Lopez et al., "Toward Personalized Adaptive Gamification: A Machine Learning Model for Predicting Performance",Nov. 27, 2018.*

(Continued)

*Primary Examiner* — Todd L Barker
(74) *Attorney, Agent, or Firm* — Danielson Legal LLC

(57) ABSTRACT

Techniques are provided for generating performance improvement recommendations for machine learning models. One method comprises evaluating performance metrics for multiple implementations of a machine learning model; computing a performance score that aggregates the performance metrics for a given machine learning model implementation; and recommending a modification to the given machine learning model implementation based on the performance score by evaluating one or more performance metrics for the given implementation relative to at least one additional performance metric for the given implementation, wherein the recommended modification is based on a performance with the recommended modification for another implementation. A given performance metric may be weighted based on an expected improvement from modifying a factor related to the given performance metric. The recommended modification to the given machine learning model implementation may comprise an indication of the expected improvement for the modification.

17 Claims, 9 Drawing Sheets

(56) References Cited

OTHER PUBLICATIONS

Masood et al., "Towards the Selection of Best Machine Learning Model for Student Performance Analysis and Prediction", 2019 6th International Conference on Soft Computing & Machine Intelligence, Nov. 19, 2019.*

Shoumo et al., "Application of Machine Learning in Credit Risk AssessmentL A Prelude to Smart Banking", TENCON 2019, Oct. 17, 2019.*

Mao et al., "Adaptive Fraud Detectin System Using Dynamic Risk Feataures", Oct. 10, 2018.*

Jiang et al., "Anomaly Detection with Graph Convolutional Networks for Insider Threat and Fraud Detection", IEEE Military Communications Conference, Nov. 1, 2019, IEEE Publishing.*

Brownlee, Jason, "Machine Learning Performance Improvement Cheat Sheet", downloaded from https://machinelearningmastery.com/machine-learning-performance-improvement-cheat-sheet/ on Jan. 30, 2020.

Ray, Sunil, "8 Proven Ways for Improving the "Accuracy" of a Machine Learning Model", downloaded from https://www.analyticsvidhya.com/blog/2015/12/improve-machine-learning-results/ on Jan. 30, 2020.

* cited by examiner

Performance Improvement Recommendation Process 200

Collect Data Using Data Collection Module 145 From Data Sources 140 and/or Fraud Detection System Backend 110;

Evaluate Predefined KPIs on Each Customer Implementation Separately;

Calculate Overall Score by Summing Weighted Category-based KPI Scores, as follows:
$$IIP_{Score} = \sum_i Category\_i\_Score,$$
where:
$$Category\_i_{score} = Weight_{KPI_i} * KPI_{Score}; \text{ and}$$

Create Reasonings for Each Weighted Category-based KPI Score That Fails to Satisfy KPI Threshold Criteria by:
  Providing KPI Test Details to Corresponding Customer;
  Recommending Modification(s) to Machine Learning Model(s) of Corresponding Customer; and
  Indicating Potential Benefit for Each Recommended Modification based on Performance Data of Other Customers.

FIG. 2

| KPI Category 410 | KPIs 420 | | | |
|---|---|---|---|---|
| Versioning | Java Script | Mobile Software Development Kit | Risk Engine | |
| Authentication Methods | Failure Rate | Failure Reason (timeout) | Modern Authentication Method | Fraud Correlation | "Lock" Ratio as Function of Authentication Method |
| Policy Configuration | Risk or Device Based | Policy Efficiency Evaluation | | | |
| Case Management | % Case Marking | | | | |
| Licensing | What's Purchased/ What's Used | Ratio Between Active Users and Licenses | Days to Renewal Date | | |
| Security | How Data is Stored (Encrypted?) | Are Usernames Anonymized/ Hashed? | Are Security Questions Encrypted? | IP Restrictions Applied? | |
| Features Usage | Multi-Channel | Threat Intelligence | Raw Data Reports | Transaction Monitoring | |
| Data Quality | Nullity Check | Distributions | | | |

| KPI Category | Score | Reasoning | Impact for Other Customers |
|---|---|---|---|
| Versioning | 7 | Newer Mobile SDK Version Available | Customers With Newer SDK Version Benefit From Additional 7% Improvement in Fraud Detection and Are Less Exposed to Latest Security Threats |
| Authentication Methods | 10 | | |
| Policy Configuration | 10 | | |
| Case Management | 5 | Low Case Marking Percentage (e.g., lower than 30%) | Customers With Higher Case Marking Percentage (e.g., 30%-50%) Benefit From Additional 17% Improvement in Fraud Detection |
| Licensing | 10 | | |
| Security | 10 | | |
| Features Usage | 10 | | |
| Data Quality | 10 | | |

FIG. 5

PERFORMANCE IMPROVEMENT RECOMMENDATIONS FOR MACHINE LEARNING MODELS

FIELD

The field relates generally to information processing systems, and more particularly, to techniques for evaluating the performance of machine learning models.

BACKGROUND

Many organizations employ processes and/or systems that are dependent on machine learning models (e.g., in a supervised or an unsupervised learning system). Anomaly detection systems, for example, may employ machine learning models to detect anomalous activity within an organization. In another example, fraud detection systems may employ machine learning models to evaluate the risk associated with a particular desired user action. A given transaction of an organization, for example, may be classified as a suspicious transaction based on a risk score assigned by the fraud detection system. User behavior models may be used by the fraud detection system to determine, for example, how closely current user behavior associated with the given transaction aligns with the user behavior expected by the user behavior models. The accuracy and performance of the user behavior models, however, may significantly impact the security of protected resources associated with the desired action.

A need exists for techniques for improving the performance of machine learning models.

SUMMARY

In one embodiment, a method comprises evaluating a plurality of performance metrics for each of a plurality of implementations of a machine learning model; computing a performance score that aggregates the plurality of performance metrics for a given implementation of the machine learning model; and recommending at least one modification to the given implementation of the machine learning model based at least in part on the performance score by evaluating one or more of the plurality of performance metrics for the given implementation of the machine learning model relative to one or more additional ones of the plurality of performance metrics for the given implementation of the machine learning model, wherein the at least one recommended modification is based at least in part on a performance with the at least one recommended modification for at least one other implementation.

In some embodiments, the performance metrics are grouped by category and a different performance score is computed for each category, and the performance score is computed for a given category by summing the performance metrics for the given category.

In one or more embodiments, each of the plurality of performance metrics are weighted based on an expected improvement for a modification of a factor related to each performance metric, and the expected improvement for a first performance metric is based on a performance of the first performance metric for at least one other implementation. The recommending the modifications to the given implementation of the machine learning model may comprise providing an indication of an expected improvement for the modifications. The expected improvement may be based, for example, on a performance with the modifications for at least one other implementation.

Other illustrative embodiments include, without limitation, apparatus, systems, methods and computer program products comprising processor-readable storage media.

BRIEF DESCRIPTION OF THE DRAWINGS

FIG. 2 illustrates exemplary pseudo code for a performance improvement recommendation process for machine learning models, according to an embodiment;

FIG. 4 is a sample table illustrating an exemplary grouping of KPIs into representative KPI categories, according to some embodiments of the disclosure;

FIG. 5 is a sample table illustrating, for each representative KPI category, the corresponding category score, category score reasoning and suggested actions to improve the respective category score, according to one or more embodiments;

DETAILED DESCRIPTION

Figure 1:
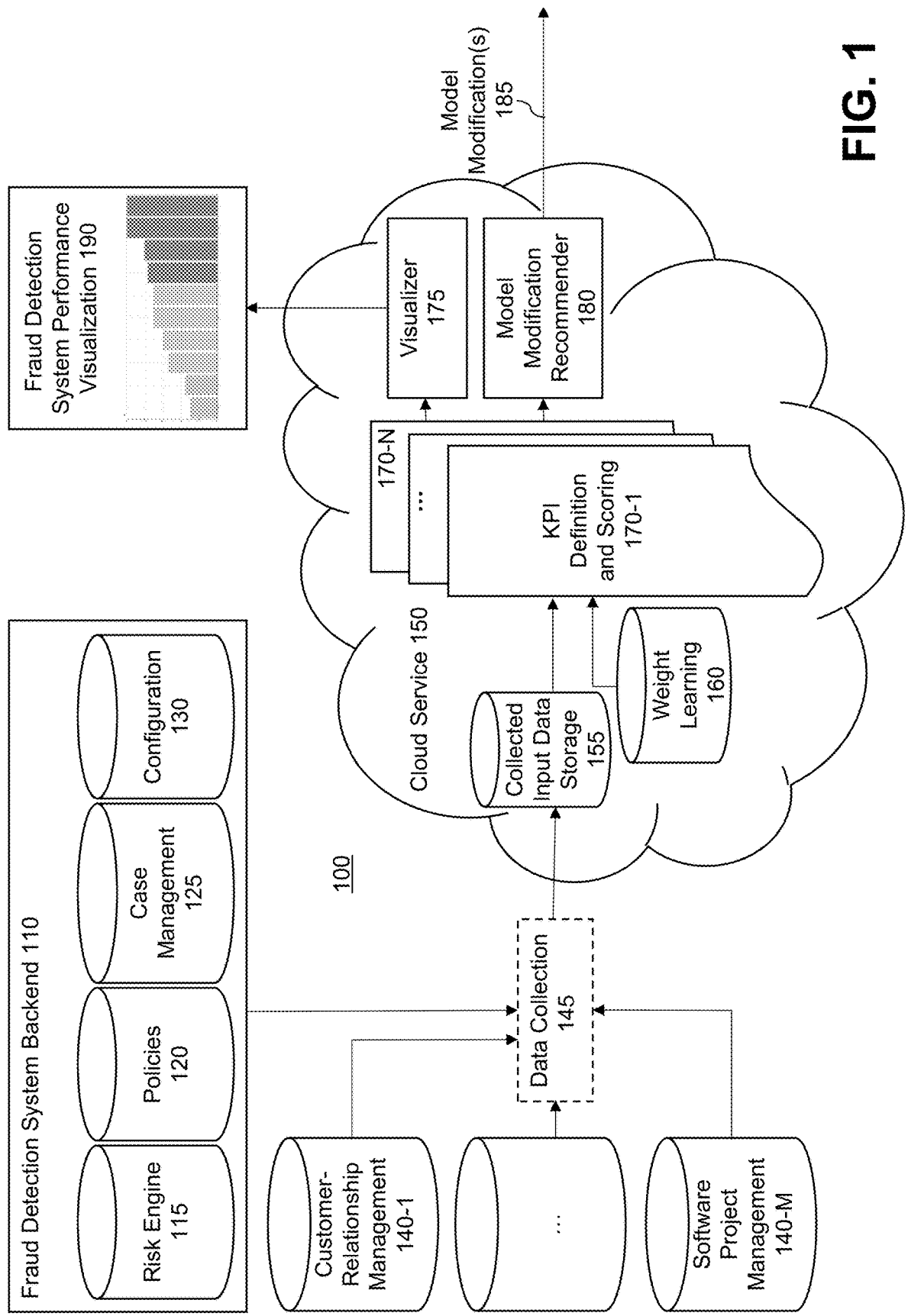
FIG. 1 illustrates an exemplary fraud detection environment for a given customer, according to one or more embodiments of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generating performance improvement recommendations for machine learning models. While one or more embodiments are described herein in the context of anomaly detection systems and/or fraud detection systems, the disclosed techniques for generating performance improvement recommendations may be used in connection with any machine learning model, as would be apparent to a person of ordinary skill in the art.

In one or more embodiments, techniques are provided for generating performance improvement recommendations for machine learning models. Generally, customers that employ various products that utilize machine learning models, such as anomaly detection systems, would like to know that the product will perform in a satisfactory manner, suitable for the customer environment and the overall needs of the customer. Currently, each customer can estimate the performance of implemented products. With fraud detection systems, for example, one performance metric is the fraud detection rate. If the fraud detection performance is low or not optimal, there is currently no way for a customer to understand from this metric how to improve the performance of the product. Performance metrics are often referred to as KPIs.

It is often difficult for a customer to identify the reasons for a particular performance level, such as a KPI, either because of a lack of knowledge or a lack of visibility into a given KPI. Thus, customers are typically unable to take appropriate steps to improve performance, when a given performance metric is out of range. Subject matter experts associated with the provider of the product may be able to consult with the customer to make appropriate suggestions to improve performance, when needed. Current advisory processes by the vendors and/or providers of such products, however, are typically manual and depend on, for example, the professionalism of a given employee and the familiarity of the given employee with the particular product. More importantly, such consultations are typically not proactive and are initiated only when a given customer is already suffering from a significant performance problem.

In one or more embodiments, category-based KPI scores, discussed further below in conjunction with FIGS. 4 and 5, are provided to customers, along with one or more recommendations to improve the performance of an anomaly detection model, or another machine learning model. In this manner, in some embodiments, techniques are provided for automatically generating performance improvement recommendations for machine learning models of a given customer, where the generated recommendations are based on the performance observed for multiple customers.

FIG. 1 illustrates an exemplary fraud detection environment 100 for a given customer, according to one or more embodiments of the disclosure. It is noted that fraud detection systems may employ, for example, supervised learning models and/or anomaly detection systems. As shown in FIG. 1, the exemplary fraud detection environment 100 comprises a fraud detection system backend 110, one or more additional data sources 140-1 through 140-M, such as a customer relationship management system 140-1 and a software project management system 140-M, a data collection module 145 and a cloud service 150. Generally, a customer relationship management (CRM) system 140-1 (such as the Salesforce™ CRM product) may be employed to manage interactions of an organization with current and potential customers. A software project management system 140-M (such as the Jira™ project management product) may be employed, for example, to manage the planning, organization and development of software projects. In other variations, the data sources 140 may comprise one or more databases comprising release notes and/or financial records.

The data collection module 145 may be implemented, for example, within a customer environment and/or within the cloud service 150, as would be apparent to a person of ordinary skill in the art.

The exemplary fraud detection system backend 110 comprises a risk engine database 115 (that comprises data related to, for example, a performance of one or more machine learning models; not shown in FIG. 1), a policies database 120, a case management database 125 and a configuration database 130. The exemplary fraud detection system backend 110 may be implemented, for example, using the RSA® Adaptive Authentication fraud and risk management system, commercially available from RSA Security LLC. In further variations, the exemplary fraud detection system backend 110 may be implemented, for example, using the RSA® SecurID Suite for identity and access management, as well as other service platforms, for example, from different vendors.

As shown in FIG. 1, the exemplary cloud service 150 comprises a collected input data storage 155, a weight learning module 160, as discussed further below in conjunction with FIG. 3, a KPI definition and scoring module 170-1 through 170-N (with one module for each KPI, in some embodiments), a visualizer 175 that generates one or more anomaly detection system performance visualizations 190, and a model modification recommender 180 that generates one or more proposed modification recommendations 185. In a further variation, the exemplary cloud service 150 may be alternatively or additionally implemented within a customer environment. The exemplary collected input data storage 155 stores the data collected by the data collection module 145.

The weight learning module 160 and the KPI definition and scoring modules 170 are discussed further below in conjunction with FIG. 3. The visualizer 175 and corresponding anomaly detection system performance visualizations 190 are discussed further below in conjunction with FIG. 6.

One or more of the devices in the FIG. 1 embodiment, such as the model modification recommender 180, are assumed to be implemented using at least one processing device. Each such processing device generally comprises at least one processor and an associated memory, and implements one or more functional modules for controlling certain features to provide the disclosed functionality for generating performance improvement recommendations for the machine learning models. More particularly, the model modification recommender 180 in this embodiment comprises a processor coupled to a memory and a network interface (not shown in FIG. 1).

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

One or more user devices within the fraud detection environment 100 may comprise, for example, mobile telephones, laptop computers, tablet computers, desktop computers or other types of devices capable of supporting user access to network resources. Such devices are examples of what are more generally referred to herein as "processing devices." Some of these processing devices are also generally referred to herein as "computers."

The user devices in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

At least portions of a network that interconnects one of more components of the fraud detection environment 100 shown in FIG. 1 may comprise an "enterprise network." Numerous other operating scenarios involving a wide variety of different types and arrangements of processing devices and networks are possible, as will be appreciated by those skilled in the art. The network is assumed to comprise a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also included in the fraud detection environment 100 (although not shown in FIG. 1) is at least one storage device that stores one or more of the risk engine database 115, the policies database 120, the case management database 125, the configuration database 130, and the collected input data storage device 155. Although the storage device may comprise multiple distinct storage devices, it will be used in the subsequent description herein to refer to a single storage device. The storage device is coupled to the network and to the model modification recommender 180. The storage device in the present embodiment is implemented using one or more storage systems associated with the model modification recommender 180. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and $^{ViPR}$®, flash-based storage arrays such as DSSD™, cloud storage products such as Elastic Cloud Storage (ECS), object-based storage products such as $^{At}$-$_{mos}$®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

The storage device can illustratively comprise a single storage array, storage disk, storage drive or other type of storage device within the fraud detection environment 100. Alternatively, the storage device can comprise one or more storage systems each having multiple storage devices implemented therein. The term "storage device" as used herein is therefore intended to be broadly construed. In some embodiments, a storage device may comprise a network share or possibly even an attached device such as a USB stick. Accordingly, in some embodiments, the storage device may be attached to one or more of the user devices in addition to or in place of being attached to the network. The stored files on the storage device may already be encrypted using a legitimate encryption process implemented by the user to protect the stored files from unauthorized access. In some embodiments, the model modification recommender 180 is co-located with one or more of the storage devices, for example, within a particular data center or other facility of a given enterprise. Alternatively, the model modification recommender 180 may be implemented in cloud infrastructure that is remote from the storage device, as shown in the FIG. 1 embodiment.

FIG. 2 illustrates exemplary pseudo code for a performance improvement recommendation process 200 for machine learning models, according to an embodiment. As shown in FIG. 2, in some embodiments, the exemplary performance improvement recommendation process 200 initially collects data using the data collection module (or agent) 145 from one or more of the data sources 140 and/or the fraud detection system backend 110.

Thereafter, the exemplary performance improvement recommendation process 200 evaluates a predefined set of KPIs on each customer implementation separately, as discussed further below in conjunction with FIGS. 3-5. The considered KPIs may be defined, for example, by one or more subject matter experts (SME), such as those employed by the provider of the model modification recommender 180 and/or the provider of the evaluated machine learning models.

An overall score is calculated, in some embodiments, by summing the weighted category-based KPI scores, as discussed further below in conjunction with FIGS. 4 and 5, as follows:

$$IIP_{Score} = \sum_i \text{Category\_i}_{Score},$$

where:

$$\text{Category\_i}_{score} = \text{Weight}_{KPIi} * \text{KPI}_{Score}.$$

In this manner, the performance score is computed for a given category by summing the plurality of KPIs (or other performance metrics) for the given category (which is determined, at least in part, by the product of the respective KPI weight and the respective KPI score).

The exemplary performance improvement recommendation process 200 then creates reasonings for each weighted category-based KPI score that fails to satisfy one or more KPI threshold criteria (such as below a certain score or a predefined number of the bottom scores), for example, by:

providing the KPI test details to the corresponding customer (in some embodiments, the performance score for each category can be presented in a sorted list);

recommending one or more modifications to the machine learning model(s) of the corresponding customer; and optionally, indicating a potential benefit for each recommended modification, in terms of, for example, fraud detection, security and/or other categories, based on the performance data of other customers, such as similar customers. In some embodiments, customers that are chosen for the comparison share the same KPI status as the evaluated customer except for the low scored KPI.

Figure 3:
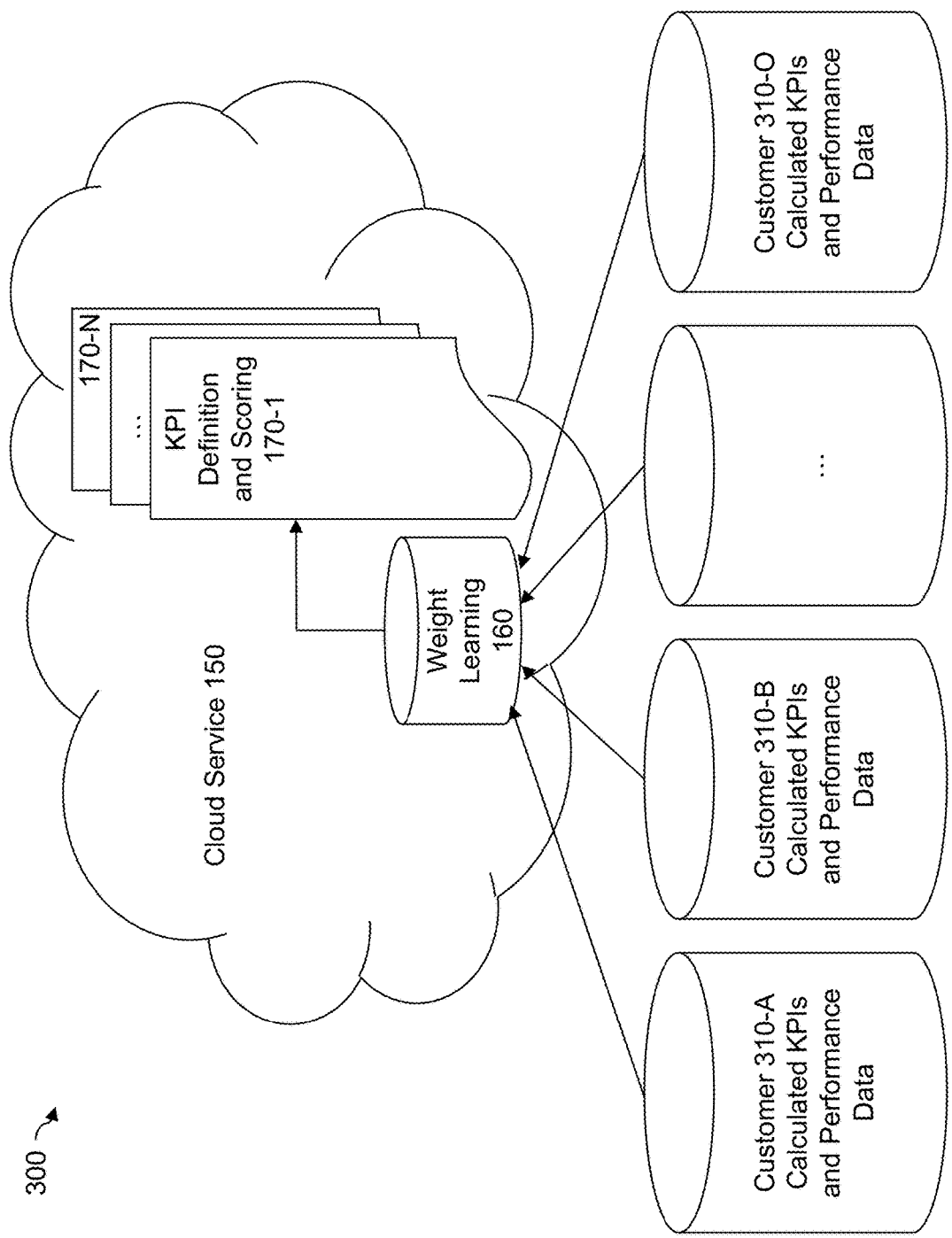
FIG. 3 illustrates a determination of one or more weights for the key performance indicators (KPIs) by the weight learning module of FIG. 1, according to some embodiments of the disclosure.

FIG. 3 illustrates a determination 300 of one or more weights for the KPIs by the weight learning module 160 of FIG. 1, according to some embodiments of the disclosure. As noted above, the performance metrics (e.g., KPIs) can be weighted based on an expected improvement for a modification of at least one factor related to each performance metric. For example, for a weighted category-based KPI score for a versioning category that indicates whether one or more applications or other software are updated to the latest available version, as discussed further below in conjunction with FIGS. 4 and 5, the expected improvement for the category score for the versioning category may indicate a performance of the corresponding category score for at least one other implementation, such as the corresponding category score for one or more implementations by at least one different customer.

Thus, a weight for a given KPI is determined in some embodiments based on a potential of the given KPI to improve performance of a given system based on a performance on for other customers of the same vendor. In one or more embodiments, supervised machine learning algorithms, such as logistic regression techniques, are used to learn an appropriate weight based on the performance and experience of multiple customers of a given vendor.

As shown in FIG. 3, the weight learning module 160 of FIG. 1 collects calculated KPIs and performance data for a plurality of customers 310-A through 310-O (for example, via the data collection module (or agent) 145. The weight learning module 160 then employs the supervised machine learning techniques to learn an appropriate weight for each KPI (and/or KPI category) based on the performance and experience of multiple customers 310-A through 310-O of the given vendor. As noted above, each weight is based, at least in part, on the expected improvement for a modification of at least one factor related to each KPI.

The weights calculated by the weight learning module 160 for each KPI can be stored, in some embodiments, by the KPI definition and scoring module 170 associated with the corresponding KPI as part of the definition of the respective KPI.

In some embodiments, customers 310 can be grouped in clusters such that customers in the same cluster will share similar characteristics (e.g., specified using predefined similarity criteria), such as number of employees, gross revenue (or other financial criteria) and industry, and the learning performed by the weight learning module 160 will be made for each cluster separately. In this manner, different weightings are obtained for multiple groupings of customer implementations having similar characteristics based on the predefined similarity criteria. In other variations, a weight for one or more KPIs can also be a static value determined or defined by business needs or capabilities of a specific customer and/or by a subject matter expert or other human analyst (and/or the monitored KPIs themselves).

FIG. 4 is a sample table 400 illustrating a grouping of KPIs into representative categories, according to some embodiments of the disclosure. In the example of FIG. 4, the representative KPI categories 410 are based on predefined Index of Industrial Production (IIP) categories. For example, as noted above, a versioning category, indicating whether one or more applications or other software are updated to the latest available version (e.g., outdated products will have a lower score), encompasses KPIs 420 for Java Script, mobile software development kit (mobile SDK) and risk engine software products. An exemplary authentication methods category encompasses KPIs for failure rate, failure reason, modern authentication method (e.g., whether or not a given authentication method is considered up-to-date), fraud correlation and a "lock" ratio as a function of authentication method.

In addition, as shown in FIG. 4, an exemplary policy configuration category provides an indication of how well policies are configured, for example, for risk-or-device based KPI and a policy efficiency evaluation KPI. An exemplary case management category encompasses one KPI for a percentage of case marking (e.g., whether a given customer should review and mark more processed transactions to provide additional labeled data for machine learning training).

In some embodiments, an exemplary licensing category encompasses KPIs for purchased and used software products, a ratio between active users and available licenses and a number of days until renewal. An exemplary security category encompasses KPIs for how data is stored (e.g., whether the data is encrypted), whether usernames are anonymized or otherwise hashed, whether security questions are encrypted, and whether IP restrictions are applied.

As also shown in FIG. 4, an exemplary features usage category encompasses KPIs for multi-channel, threat intelligence, raw data reports and transaction monitoring. Finally, the exemplary table 400 of FIG. 4 comprises a data quality category that encompasses KPIs for nullity check and distributions.

In this manner, as noted above, multiple KPIs (or other performance metrics) are grouped by category, in some embodiments, and a different performance score is computed for each category. The category scores are determined by the KPI weight and KPI score for a given KPI, as defined by the category score equation in FIG. 2.

FIG. 5 is a sample table 500 illustrating, for each representative KPI category, the corresponding category score, category score reasoning and suggested actions to improve the respective category score, according to one or more embodiments. In this manner, the provided visibility into KPI category scores and the corresponding suggested actions, will allow customers to better understand their own environment and guide them to better data-driven business decisions to perform configuration or implementation improvements. Generally, as discussed below, the category score reasoning and suggested actions are based on the particular KPI(s) within a given low scoring category that contributed to the low score.

For example, consider a given customer of a fraud detection system, such as the RSA® Adaptive Authentication fraud and risk management system, referenced above. Assume that the given customer has not updated the mobile SDK to the latest available version, as the customer missed the newer version release notes. In addition, also assume that the given customer also has a relatively low case marking rate (relative to other customers of the same vendor, and also relative to the other KPI categories for the given customer). Thus, even though the fraud detection product will still provide some value (e.g., the product will detect fraud), an overall performance (e.g., fraud detection performance) may decrease for the given customer.

The disclosed techniques for generating performance improvement recommendations for such machine learning models will evaluate the representative KPI categories identified in FIG. 4 to compute category scores that are compared to the category scores of other customers or users of the same vendor. This particular customer demonstrates relatively low scores for the versioning category and the case management category, for the above stated reasons.

As shown in FIG. 5, for the low scoring versioning category, the reasoning indicates that a newer mobile SDK version is available, and the suggested action is that customers with a newer SDK version benefit from an additional 7% improvement in fraud detection and are less exposed to the latest security threats (based on an impact for other customers).

Likewise, for the low case management category, the reasoning indicates that the score is caused by a low case marking percentage (e.g., lower than 30%), and the suggested action is that customers with a higher case marking percentage (e.g., 30%-50%) benefited from an additional 17% improvement in fraud detection.

In some embodiments, the example reasonings shown in FIG. 5 can be determined for each low scored KPI category, as follows:
  provide KPI test details;
  provide potential benefit, for example, in terms of fraud detection, security and/or other categories for a representative fraud detection system, based on the performance of similar customers (for example, customers used for the comparison can share the same KPI status as the evaluated customer except for the low scoring KPI); and
  suggest consultancy and/or advisory with the product vendor based on the information presented, for example, in a dashboard followed by indicated practical solutions.

As a result, the customer not only knows that there is something that the customer can do to maximize the system performance, but the customer also knows the extent of the potential improvement that can be expected (through the score and the impact for other customers) and the customer can prioritize the suggested changes accordingly. For example, the customer can direct a mobile developer to upgrade to a newer SDK version, to reinforce the fraud analyst team to deal with a larger volume of cases, and to engage with the vendor to evaluate whether policies can be improved.

Figure 6:
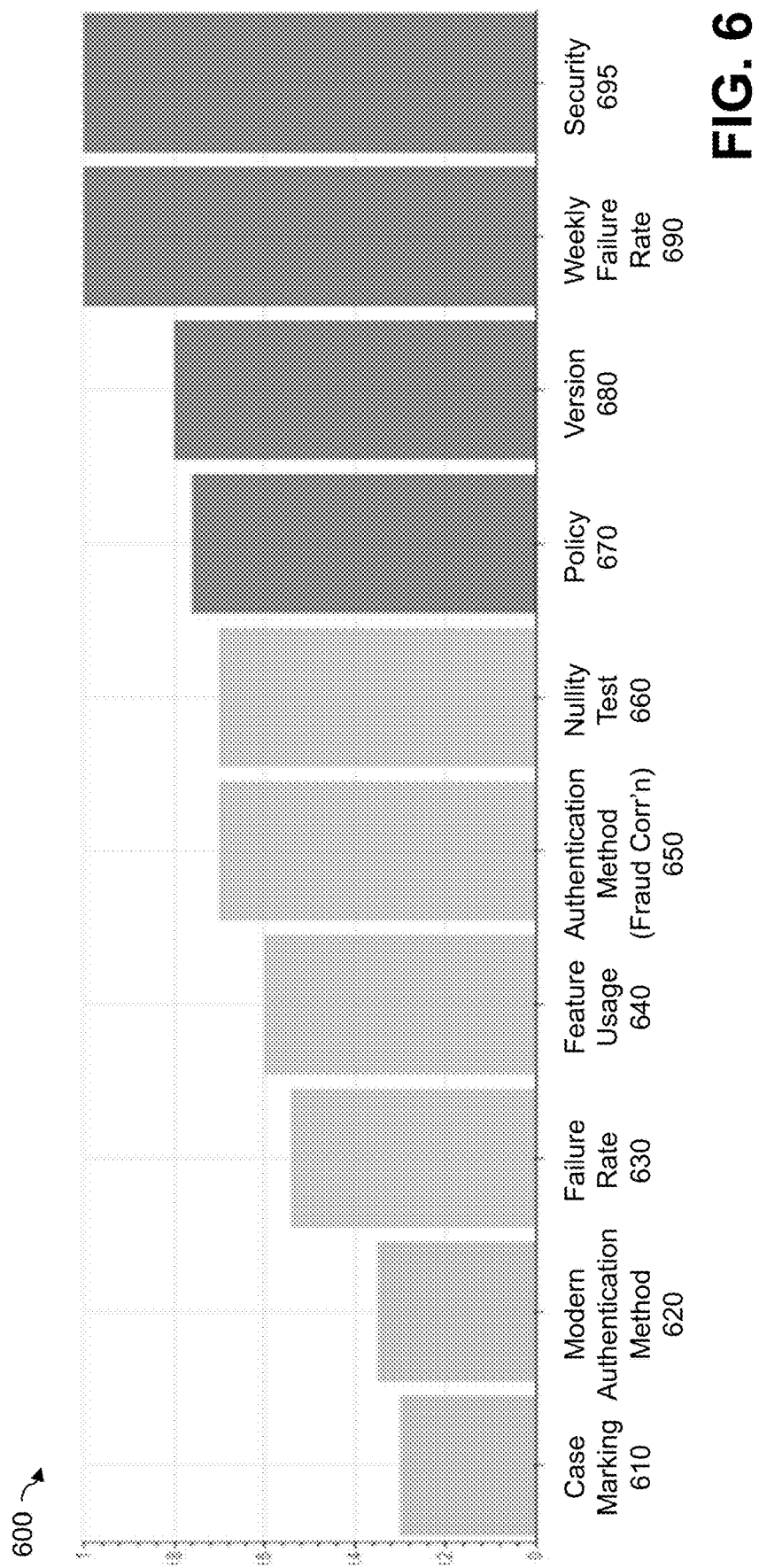
FIG. 6 illustrates an exemplary performance visualization generated by the visualizer of FIG. 1, according to at least one embodiment of the disclosure.

FIG. 6 illustrates an exemplary performance visualization 600 generated by the visualizer 175 of FIG. 1, according to at least one embodiment of the disclosure. In the example of FIG. 6, individual KPI scores are indicated in a bar graph format for a number of the individual KPIs 610, 620, 630, 640, 650, 660, 670, 680, 690, 695 (applicable to a representative fraud detection system) that are addressed in the table 400 of FIG. 4 (ranked by individual KPI score. In some embodiments, a dashboard can also be presented with the aggregated category scores for the KPIs within each KPI category of FIG. 4 (for example), optionally ranked by category score.

Figure 7:
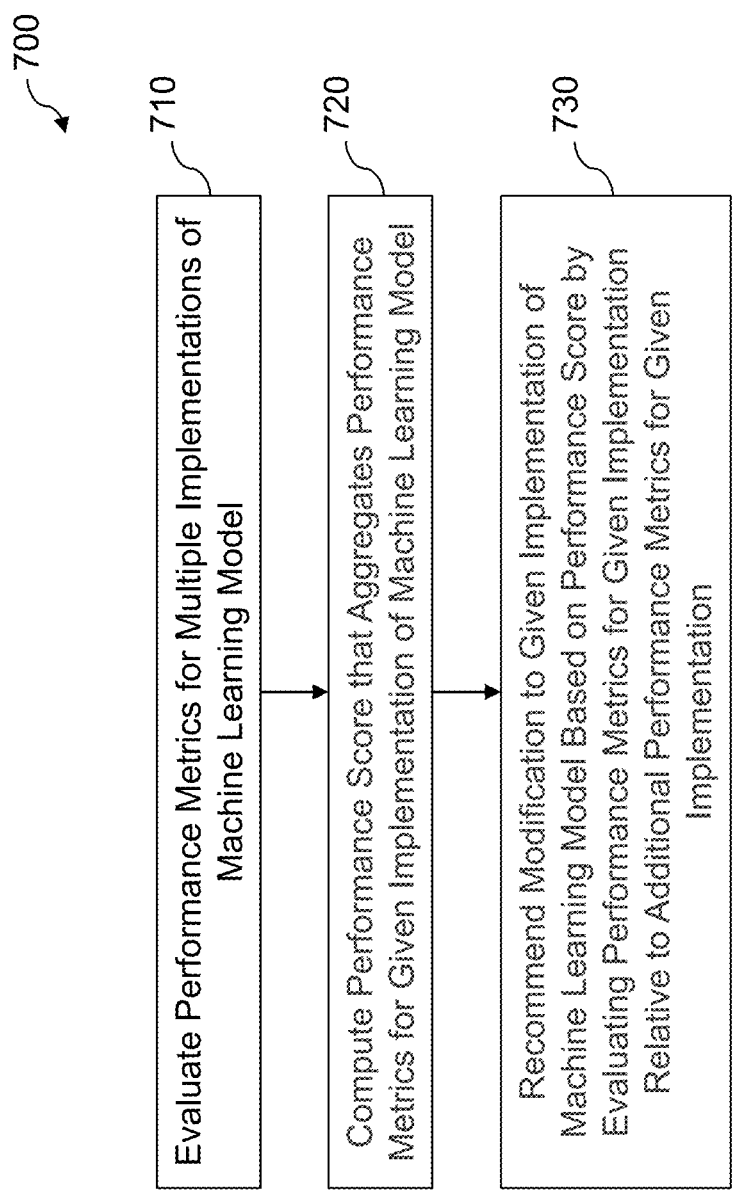
FIG. 7 is a flow chart illustrating an exemplary implementation of a machine learning performance improvement recommendation process, according to one embodiment.

FIG. 7 is a flow chart illustrating an exemplary implementation of a machine learning performance improvement recommendation process 700, according to one embodiment of the disclosure. As shown in FIG. 7, the exemplary machine learning performance improvement recommendation process 700 initially evaluates a plurality of performance metrics (e.g., KPIs) during step 710 for each of a plurality of implementations (e.g., one or more implementations for each customer) of a machine learning model.

The exemplary machine learning performance improvement recommendation process 700 computes a performance score during step 720 that aggregates the plurality of performance metrics for a given implementation of the machine learning model. One or more modifications to the given implementation of the machine learning model are recommended during step 730, based at least in part on the performance score by evaluating one or more of the plurality of performance metrics for the given implementation of the machine learning model relative to one or more additional performance metrics for the given implementation of the machine learning model. The recommended modifications are based at least in part on a performance with the at least one recommended modification for at least one other implementation (e.g., of another customer).

In some embodiments, the individual KPI scores and/or the aggregated KPI category scores can be presented, for example, in a dashboard, optionally with a suggestion for the given customer to consult with the vendor of the product based on indicated practical solutions, or with suggested reasoning and actions based on the example table 500 of FIG. 5.

In an exemplary fraud detection implementation, upon detection of a predefined fraud, the service provider can optionally initiate or execute one or more predefined remedial steps and/or mitigation steps to address the detected predefined fraud (or other anomalies, for example). For example, the predefined remedial steps and/or mitigation steps to address the detected predefined anomalies may comprise the transmission of an alert or alarm to the user device and/or user for important or suspicious events; isolating, removing, quarantining, limiting permissions, analyzing, and deactivating one or more of the user devices and/or one or more files, accounts or aspects of the user devices or the user; notifying one or more third party systems (such as sending an email, or generating an alert in another system); restricting access of one or more accounts and/or one or more devices from accessing a network, files or folders; initiating a step-up authentication with one or more additional authentication factors; resetting or limiting permissions associated with a file or folder; quarantining one or more files or folders, and preventing (or otherwise limiting) one or more further actions from being executed associated with a user device, user account or machine associated with the detected anomalous activity.

Among other benefits, the disclosed techniques for generating performance improvement recommendations for machine learning models (for example, in an online fraud detection market) will help customers to understand how to improve system performance by mapping defined steps (based on the predefined KPIs) that a customer can take to improve the performance. In addition, the suggested steps can be prioritized in some embodiments by a potential performance impact. In this manner, the customer can create a gradual investment plan based on the costs of each proposed step and the expected corresponding performance impact for each proposed step based on the experience of other customers. Moreover, the disclosed techniques are automated in at least some embodiments (and optionally run in the background), to thereby reduce the time for identifying a particular issue.

One or more embodiments of the disclosure provide improved methods, apparatus and computer program products for generating performance improvement recommendations for machine learning models. The foregoing applications and associated embodiments should be considered as illustrative only, and numerous other embodiments can be configured using the techniques disclosed herein, in a wide variety of different applications.

It should also be understood that the disclosed performance improvement recommender techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for generating performance improvement recommendations for machine learning models may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based performance improvement recommender engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based performance improvement recommender platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
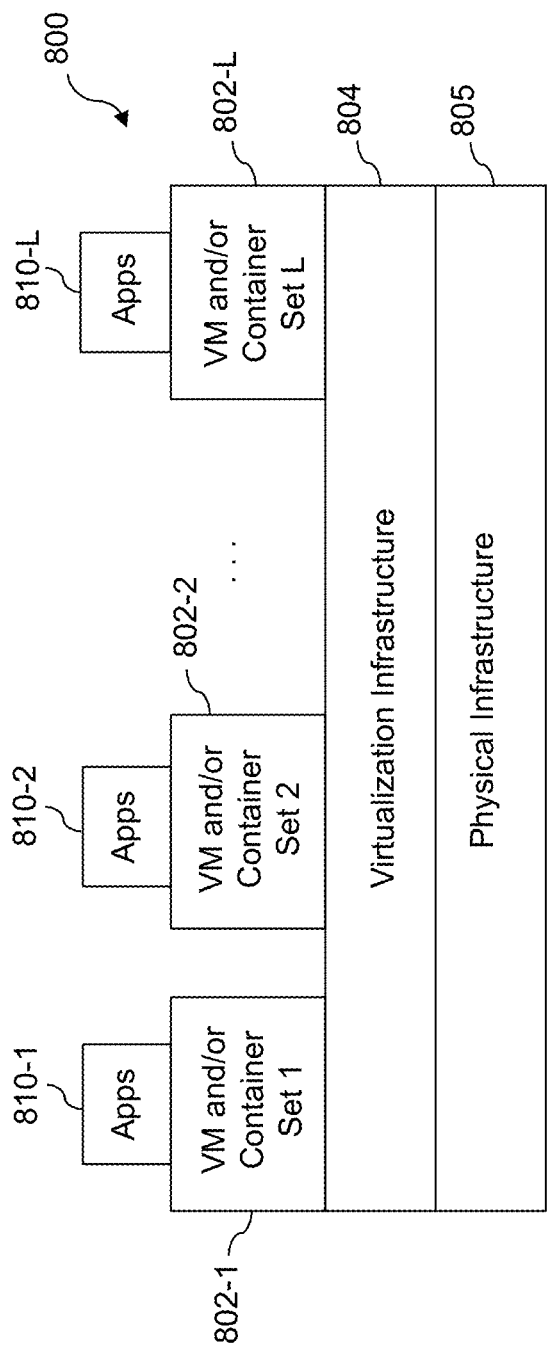
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing systems shown in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide performance improvement recommender functionality of the type described above for one or more processes running on a given one of the VMs. For example, each of the VMs can implement performance improvement recommender control logic and associated KPI category grouping tables for providing performance improvement recommender functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide performance improvement recommender functionality of the type described above for one or more processes running on different ones of the containers. For example, a container host device supporting multiple containers of one or more container sets can implement one or more instances of performance improvement recommender control logic and associated KPI category grouping tables for use in generating performance improvement recommendations.

As is apparent from the above, one or more of the processing modules or other components of the disclosed system may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, a FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
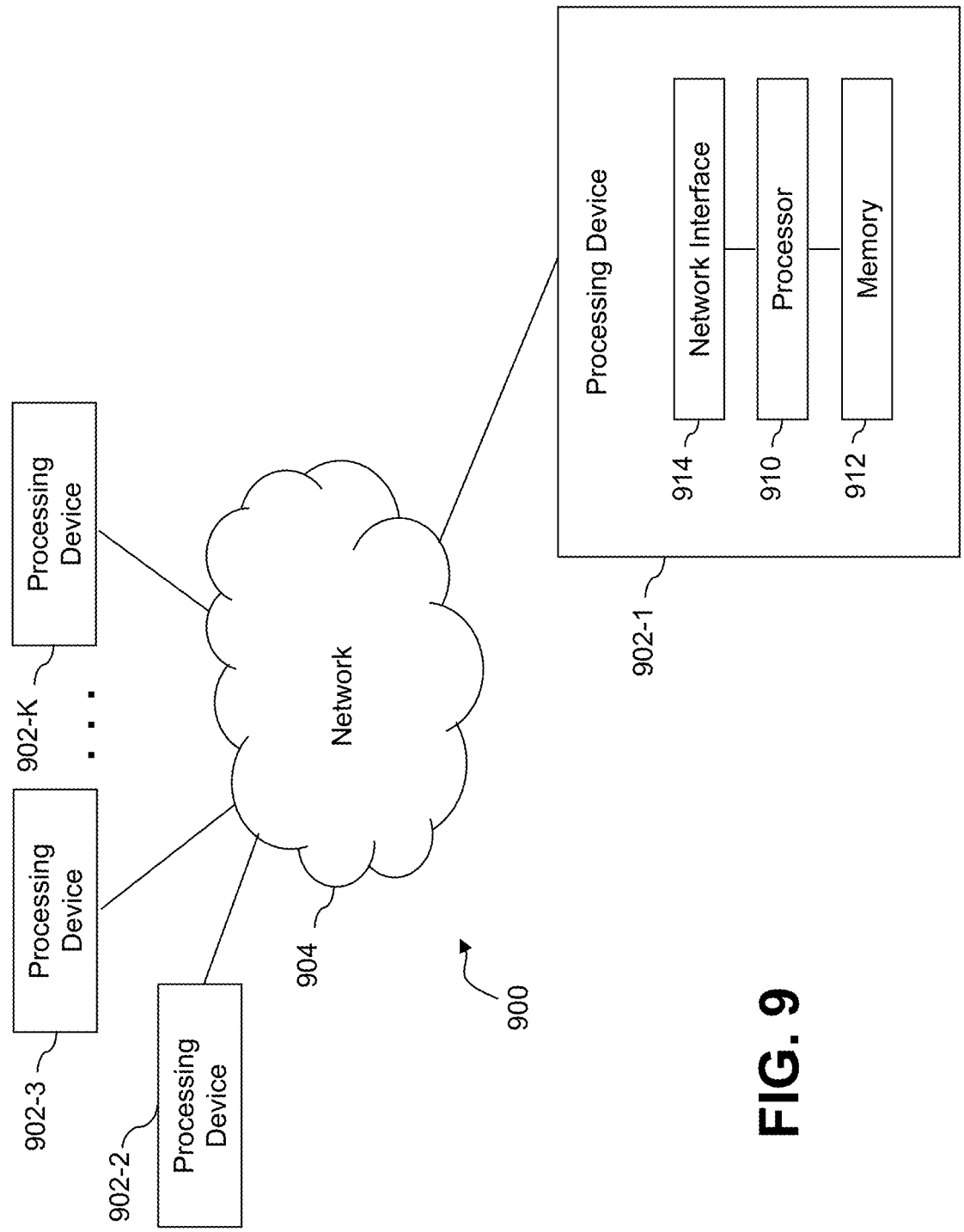
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

evaluating a plurality of performance metrics for a first implementation of a machine learning model and for a second implementation of the machine learning model, wherein the first implementation is associated with a first entity and the second implementation is associated with a second entity;

computing a performance score that aggregates the plurality of performance metrics for the first implementation of the machine learning model;

recommending to a user at least one modification to the first implementation of the machine learning model based at least in part on the performance score by evaluating one or more of the plurality of performance metrics for the first implementation of the machine learning model, wherein the at least one recommended modification is to change a factor associated with a first metric of the plurality of performance metrics for an expected improvement based at least in part on a performance of the first metric for the second implementation, wherein the method is performed by at least one processing device comprising a processor coupled to a memory.

2. The method of claim 1, wherein the performance metrics are grouped by category and a different performance score is computed for each category.

3. The method of claim 2, wherein the performance score is computed for a given category by summing the performance metrics for the given category.

4. The method of claim 3, further comprising providing the performance score for each category in a sorted list.

5. The method of claim 1, wherein each of the plurality of performance metrics are weighted based, at least in part, on an expected improvement for a modification of a factor related to each performance metric.

6. The method of claim 5, wherein different weightings are obtained for multiple groupings of implementations having similar characteristics based on one or more predefined similarity criteria.

7. The method of claim 1, wherein the recommending the at least one modification to the first implementation of the machine learning model further comprises providing an indication of the expected improvement.

8. The method of claim 1, wherein the evaluating the plurality of performance metrics for the first implementation of the machine learning model relative to one or more additional ones of the plurality of performance metrics for the second implementation of the machine learning model further comprises determining one or more reasons for a lower score.

9. An apparatus comprising:
at least one processing device comprising a processor coupled to a memory;
the at least one processing device being configured to implement the following steps:
evaluating a plurality of performance metrics for a first implementation of a machine learning model and for a second implementation of the machine learning model, wherein the first implementation is associated with a first entity and the second implementation is associated with a second entity;
computing a performance score that aggregates the plurality of performance metrics for the first implementation of the machine learning model; and
recommending to a user at least one modification to the first implementation of the machine learning model based at least in part on the performance score by evaluating one or more of the plurality of performance metrics for the first implementation of the machine learning model, wherein the at least one recommended modification is to change a factor associated with a first metric of the plurality of performance metrics for an expected improvement based at least in part on a performance of the first metric for the second implementation.

10. The apparatus of claim 9, wherein the performance metrics are grouped by category and a different performance score is computed for each category, and wherein the performance score is computed for a given category by summing the performance metrics for the given category.

11. The apparatus of claim 9, wherein each of the plurality of performance metrics are weighted based, at least in part, on an expected improvement for a modification of a factor related to each performance metric.

12. The apparatus of claim 9, wherein the evaluating the plurality of performance metrics for the first implementation of the machine learning model relative to one or more additional ones of the plurality of performance metrics for the second implementation of the machine learning model further comprises determining one or more reasons for a lower score.

13. A non-transitory processor-readable storage medium having stored therein program code of one or more software programs, wherein the program code when executed by at least one processing device causes the at least one processing device to perform the following steps:
evaluating a plurality of performance metrics for a first implementation of a machine learning model and for a second implementation of the machine learning model, wherein the first implementation is associated with a first entity and the second implementation is associated with a second entity;
computing a performance score that aggregates the plurality of performance metrics for the first implementation of the machine learning model; and
recommending to a user at least one modification to the first implementation of the machine learning model based at least in part on the performance score by evaluating one or more of the plurality of performance metrics for the first implementation of the machine learning model, wherein the at least one recommended modification is to change a factor associated with a first metric of the plurality of performance metrics for an expected improvement based at least in part on a performance of the first metric for the second implementation.

14. The non-transitory processor-readable storage medium of claim 13, wherein the performance metrics are grouped by category and a different performance score is computed for each category, and wherein the performance score is computed for a given category by summing the performance metrics for the given category.

15. The non-transitory processor-readable storage medium of claim 13, wherein each of the plurality of performance metrics are weighted based, at least in part, on an expected improvement for a modification of a factor related to each performance metric.

16. The non-transitory processor-readable storage medium of claim 13, wherein the at least one modification to the first implementation of the machine learning model further comprises providing an indication of the expected improvement.

17. The non-transitory processor-readable storage medium of claim 13, wherein the evaluating the plurality of performance metrics for the first implementation of the machine learning model relative to one or more additional ones of the plurality of performance metrics for the second implementation of the machine learning model further comprises determining one or more reasons for a lower score.

* * * * *